United States Patent
Yoon et al.

(10) Patent No.: US 11,439,287 B2
(45) Date of Patent: Sep. 13, 2022

(54) CONTROLLING METHOD OF ROBOT CLEANER

(71) Applicant: LG ELECTRONICS INC., Seoul (KR)

(72) Inventors: Sungho Yoon, Seoul (KR); Jaewon Jang, Seoul (KR); Jeongseop Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 789 days.

(21) Appl. No.: 16/256,435

(22) Filed: Jan. 24, 2019

(65) Prior Publication Data
US 2019/0223677 A1    Jul. 25, 2019

(30) Foreign Application Priority Data

Jan. 25, 2018    (KR) .................. 10-2018-0009437

(51) Int. Cl.
| | |
|---|---|
| *A47L 11/206* | (2006.01) |
| *G05D 1/02* | (2020.01) |
| *A47L 11/40* | (2006.01) |
| *B25J 11/00* | (2006.01) |
| *A47L 11/292* | (2006.01) |
| *A47L 11/293* | (2006.01) |

(52) U.S. Cl.
CPC .......... *A47L 11/206* (2013.01); *A47L 11/292* (2013.01); *A47L 11/293* (2013.01); *A47L 11/4011* (2013.01); *A47L 11/4038* (2013.01); *A47L 11/4061* (2013.01); *A47L 11/4066* (2013.01); *B25J 11/0085* (2013.01); *G05D 1/0223* (2013.01); *G05D 1/0238* (2013.01); *A47L 2201/04* (2013.01); *G05D 2201/0215* (2013.01)

(58) Field of Classification Search
CPC .... A47L 11/206; A47L 11/292; A47L 11/293; A47L 11/4011; A47L 11/4038; A47L 11/4061; A47L 11/4066; A47L 2201/04; A47L 2201/06; B25J 11/0085; G05D 1/0223; G05D 1/0238; G05D 2201/0215; G05D 2201/0203; G05D 1/027
See application file for complete search history.

(56) References Cited

U.S. PATENT DOCUMENTS

| | | | |
|---|---|---|---|
| 2,988,762 | A | 6/1961 | Babcock |
| 5,421,053 | A | 6/1995 | Chodak |
| 5,716,730 | A | 2/1998 | Deguchi |

(Continued)

FOREIGN PATENT DOCUMENTS

| | | |
|---|---|---|
| CN | 1320409 | 11/2001 |
| CN | 1575724 | 2/2005 |

(Continued)

OTHER PUBLICATIONS

United States Office Action dated Jun. 17, 2020 issued in co-pending related U.S. Appl. No. 16/057,550.

(Continued)

*Primary Examiner* — David Redding
(74) *Attorney, Agent, or Firm* — KED & Associates LLP

(57) ABSTRACT

The present disclosure relates controlling a robot cleaner that moves based on a rotation of a spin mop. The controlling the robot cleaner includes determining a control command; operating the spin mop and performing a reference motion by the robot cleaner; detecting a movement of the robot cleaner which performs a reference motion by a motion detection sensor; and controlling travel of the robot cleaner to achieve the control command.

14 Claims, 11 Drawing Sheets

(56) References Cited

U.S. PATENT DOCUMENTS

| | | | |
|---|---|---|---|
| 5,998,953 | A | 12/1999 | Nakamura et al. |
| 6,012,618 | A | 1/2000 | Matsuo |
| 8,898,844 | B1 | 12/2014 | Dooley et al. |
| 11,197,595 | B2 | 12/2021 | Jang et al. |
| 2004/0143927 | A1 | 7/2004 | Haegermarck et al. |
| 2004/0181896 | A1 | 9/2004 | Egawa et al. |
| 2005/0015913 | A1 | 1/2005 | Kim et al. |
| 2005/0166356 | A1 | 8/2005 | Uehigashi |
| 2006/0185690 | A1 | 8/2006 | Song et al. |
| 2007/0051757 | A1 | 3/2007 | Lim et al. |
| 2007/0061040 | A1 | 3/2007 | Augenbraun et al. |
| 2008/0276407 | A1 | 11/2008 | Schnittman et al. |
| 2009/0064447 | A1 | 3/2009 | Oh et al. |
| 2009/0281661 | A1 | 11/2009 | Dooley et al. |
| 2010/0251497 | A1 | 10/2010 | Arnold |
| 2011/0202175 | A1 | 8/2011 | Romanov et al. |
| 2012/0079670 | A1 | 4/2012 | Yoon et al. |
| 2012/0168971 | A1 | 7/2012 | Hansen et al. |
| 2012/0169497 | A1 | 7/2012 | Schnittman et al. |
| 2012/0222706 | A1 | 9/2012 | Pears et al. |
| 2014/0196247 | A1 | 7/2014 | Kasper |
| 2014/0259478 | A1 | 9/2014 | Conrad |
| 2015/0026920 | A1 | 1/2015 | Hsu |
| 2015/0143646 | A1 | 5/2015 | Jeong et al. |
| 2015/0182090 | A1 | 7/2015 | Park et al. |
| 2015/0223653 | A1 | 8/2015 | Kim et al. |
| 2016/0095487 | A1 | 4/2016 | Koura et al. |
| 2016/0150934 | A1 | 6/2016 | Kim et al. |
| 2016/0214260 | A1 | 7/2016 | Lee et al. |
| 2016/0331112 | A1 | 11/2016 | Goff |
| 2016/0353960 | A1 | 12/2016 | Dooley et al. |
| 2017/0071435 | A1 | 3/2017 | Jeong |
| 2017/0143175 | A1 | 5/2017 | Kim et al. |
| 2017/0147000 | A1 | 5/2017 | Hoennige et al. |
| 2017/0181591 | A1 | 6/2017 | Tanaka et al. |
| 2017/0296021 | A1 | 10/2017 | Li et al. |
| 2018/0242810 | A1 | 8/2018 | Jang et al. |
| 2019/0191952 | A1 | 6/2019 | Johnson et al. |
| 2019/0290089 | A1 | 9/2019 | Johnson et al. |

FOREIGN PATENT DOCUMENTS

| | | |
|---|---|---|
| CN | 1823677 | 8/2006 |
| CN | 102292973 | 12/2011 |
| CN | 102440718 | 5/2012 |
| CN | 102481080 | 5/2012 |
| CN | 202505272 | 10/2012 |
| CN | 202681849 | 1/2013 |
| CN | 103899160 | 7/2014 |
| CN | 104068799 | 10/2014 |
| CN | 204581160 | 8/2015 |
| CN | 104918529 | 9/2015 |
| CN | 105873486 | 8/2016 |
| CN | 106102537 | 11/2016 |
| CN | 106510556 | 3/2017 |
| CN | 106725135 | 5/2017 |
| EP | 1 695 652 | 8/2006 |
| EP | 1 762 165 | 3/2007 |
| EP | 2 327 347 | 6/2011 |
| EP | 2 438 843 | 4/2012 |
| EP | 2 875 768 | 5/2015 |
| EP | 3 138 459 | 3/2017 |
| JP | S45-013591 | 6/1970 |
| JP | S49-65061 | 6/1974 |
| JP | S57-037431 | 3/1982 |
| JP | S63-168142 | 7/1988 |
| JP | S63-200731 | 8/1988 |
| JP | H07-009245 | 2/1995 |
| JP | H09-017404 | 1/1997 |
| JP | H09-324875 | 12/1997 |
| JP | H10-211132 | 8/1998 |
| JP | H10-243066 | 9/1998 |
| JP | 2001-249734 | 9/2001 |
| JP | 2002-0655338 | 3/2002 |
| JP | 2003-3120322 | 11/2003 |
| JP | 2004-166968 | 6/2004 |
| JP | 2005-040578 | 2/2005 |
| JP | 2005-211368 | 8/2005 |
| JP | 2005-211426 | 8/2005 |
| JP | 2005-312702 | 11/2005 |
| JP | 2006-231028 | 9/2006 |
| JP | 2009-509220 | 3/2009 |
| JP | 4278591 | 6/2009 |
| JP | 2009-178345 | 8/2009 |
| JP | 2014-014455 | 1/2014 |
| JP | 2014-137694 | 7/2014 |
| JP | 2015-163153 | 9/2015 |
| KR | 20-1988-0011603 | 8/1988 |
| KR | 10-0241620 | 4/2000 |
| KR | 10-2005-0012047 | 1/2005 |
| KR | 20-0395016 | 9/2005 |
| KR | 10-0661339 | 12/2006 |
| KR | 10-2007-0101432 | 10/2007 |
| KR | 20-0437646 | 12/2007 |
| KR | 10-0814507 | 3/2008 |
| KR | 10-2008-0040761 | 5/2008 |
| KR | 10-0835968 | 6/2008 |
| KR | 10-0848568 | 7/2008 |
| KR | 10-2008-0081626 | 9/2008 |
| KR | 10-2008-0089966 | 10/2008 |
| KR | 10-0871114 | 11/2008 |
| KR | 10-2010-0076134 | 7/2010 |
| KR | 10-1026003 | 3/2011 |
| KR | 20-0458863 | 3/2012 |
| KR | 10-2012-0069845 | 6/2012 |
| KR | 10-1152720 | 6/2012 |
| KR | 10-1164291 | 7/2012 |
| KR | 10-2012-0129185 | 11/2012 |
| KR | 10-1323597 | 11/2013 |
| KR | 10-1338143 | 12/2013 |
| KR | 10-2014-0011216 | 1/2014 |
| KR | 10-1369220 | 3/2014 |
| KR | 10-2014-0060450 | 5/2014 |
| KR | 10-2014-0089556 | 7/2014 |
| KR | 10-1487778 | 1/2015 |
| KR | 10-2015-0014351 | 2/2015 |
| KR | 10-1495866 | 2/2015 |
| KR | 10-2015-0057959 | 5/2015 |
| KR | 10-1519685 | 5/2015 |
| KR | 10-2015-0073726 | 7/2015 |
| KR | 10-2015-0078094 | 7/2015 |
| KR | 10-2015-0095469 | 8/2015 |
| KR | 10-1543490 | 8/2015 |
| KR | 10-1544667 | 8/2015 |
| KR | 10-2015-0107398 | 9/2015 |
| KR | 10-2015-0139111 | 12/2015 |
| KR | 10-1578879 | 12/2015 |
| KR | 10-2016-0003435 | 1/2016 |
| KR | 10-1602790 | 3/2016 |
| KR | 10-1622740 | 5/2016 |
| KR | 10-2016-0090567 | 8/2016 |
| KR | 10-2016-0090571 | 8/2016 |
| KR | 10-2016-0097085 | 8/2016 |
| KR | 10-1654014 | 9/2016 |
| KR | 10-1678443 | 12/2016 |
| KR | 10-2017-0035823 | 3/2017 |
| KR | 10-2017-0049532 | 5/2017 |
| KR | 10-2017-0124216 | 11/2017 |
| KR | 10-2018-0008250 | 1/2018 |
| KR | 10-2018-0025795 | 3/2018 |
| WO | WO 2005/011461 | 2/2005 |
| WO | WO 2009/132317 | 10/2009 |
| WO | WO 2015 / 186944 | 12/2015 |
| WO | WO 2016/036183 | 3/2016 |
| WO | WO 2017 / 191928 | 11/2017 |

OTHER PUBLICATIONS

European Search Report dated Apr. 6, 2021 issued in EP Application No. 18843150.6.

International Search Report dated Dec. 4, 2018 issued in PCT/KR2018/008928.

(56) References Cited

OTHER PUBLICATIONS

International Search Report dated Dec. 7, 2018 issued in PCT/KR2018/008922.
International Search Report dated Dec. 10, 2018 issued in PCT/KR2018/008954 (English translation).
International Search Report dated May 22, 2019 issued in PCT/KR2019/001021.
United States Office Action dated Apr. 24, 2020 issued in U.S. Appl. No. 16/057,492.
European Search Report dated Nov. 16, 2018 issued in EP Application No. 18187634.3.
European Search Report dated Apr. 9, 2021 issued in EP Application No. 18843690.1.
European Search Report dated Nov. 14, 2018 issued in EP Application No. 18187619.4.
European Search Report dated Nov. 14, 2018 issued in EP Application No. 18187630.1.
European Search Report dated Apr. 12, 2021 issued in EP Application No. 18844056.4.
Chinese Office Action dated Dec. 24, 2020 issued in CN Application No. 201880065199.2.
Chinese Office Action dated Aug. 12, 2021 issued in CN Application No. 201880065199.2.
U.S. Appl. No. 16/057,394, filed Aug. 7, 2018.
U.S. Appl. No. 16/057,492, filed Aug. 7, 2018.
U.S. Appl. No. 16/056,971, filed Aug. 7, 2018.
U.S. Appl. No. 16/057,572, filed Aug. 7, 2018.
United States Notice of Allowance dated May 11, 2020 issued in U.S. Appl. No. 16/057,572.
United States Office Action dated Oct. 21, 2020 issued in U.S. Appl. No. 16/057,076.
United States Office Action dated Nov. 19, 2020 issued in U.S. Appl. No. 16/057,448.
United States Office Action dated Feb. 9, 2021 issued in U.S. Appl. No. 16/057,516.
Chinese Office Action (with English translation) dated Dec. 21, 2020 issued in CN Application No. 201880065247.8.
Chinese Office Action (with English translation) dated Dec. 28, 2020 issued in CN Application No. 201880065371.4.
European Search Report dated Mar. 29, 2021 issued in EP Application No. 18844052.3.
Chinese Office Action (with English translation) dated Mar. 9, 2021 issued in CN Application No. 201880065253.3.
European Search Report dated Mar. 26, 2021 issued in EP Application No. 18842946.8.
Chinese Office Action (with English translation) dated May 11, 2021 issued in CN Application No. 201980021890.5.
U.S. Office Action dated Oct. 5, 2021 issued in U.S. Appl. No. 16/057,076.
United States Office Action dated Mar. 18, 2022 issued in co-pending related U.S. Appl. No. 16/057,076.
U.S. Appl. No. 16/057,448, filed Aug. 7, 2018.
U.S. Appl. No. 17/207,371, filed Mar. 19, 2021.
U.S. Appl. No. 16/256,435, filed Jan. 24, 2019.
U.S. Appl. No. 16/057,516, filed Aug. 7, 2018.
U.S. Appl. No. 16/057,076, filed Aug. 7, 2018.
U.S. Appl. No. 17/180,495, filed Feb. 19, 2021.
U.S. Appl. No. 16/057,550, filed Aug. 7, 2018.

CONTROLLING METHOD OF ROBOT CLEANER

CROSS-REFERENCE TO RELATED APPLICATION(S)

This application claims priority under 35 U.S.C. § 119 to Korean Application No. 10-2018-0009437 filed on Jan. 25, 2018, whose entire disclosure is hereby incorporated by reference. This application is related to U.S. application Ser. No. 16/057,394, U.S. application Ser. No. 16/057,448, U.S. application Ser. No. 16/057,492, U.S. application Ser. No. 16/057,516, U.S. application Ser. No. 16/057,076, U.S. application Ser. No. 16/056,971, U.S. application Ser. No. 16/057,550, and U.S. application Ser. No. 16/057,572 whose disclosures are also incorporated by reference. Further, one of ordinary skill in the art will recognize that features disclosed in these above-noted applications may be combined in any combination with features disclosed herein.

BACKGROUND

1. Field

The present disclosure relates to controlling a robot cleaner, and more particularly, to controlling a robot cleaner having a rotation mop.

2. Background

The use of robots in the home has gradually expanded. One example of such a household robot is a cleaning robot (also referred to herein as an autonomous cleaner). The cleaning robot is a mobile robot that travels autonomously within a certain area and can automatically clean while moving. For example, the robot vacuum cleaner may automatically suction foreign substances, such as dust, accumulated on a floor or can clean by mopping the floor by using a rotation mop.

The cleaning robot with the rotation mop may also move based on a spinning of the rotation mop. In addition, the rotation mop may include a cleaning surface, such as a damp cloth, that is positioned adjacent to the floor, and the robot cleaner may supply water to the cleaning surface of the rotation mop.

However, in the robot cleaner which moves using the rotation mop that spins while in contact with the floor, slippage may occur between the rotation mop and the floor. The slippage may cause a moving distance of the robot cleaner to be decreased in comparison a possible moving distance associated with the actual rotation of the rotation mop.

Korean Patent No. KR1578879B1 describes a cleaning mobile robot that moves and cleans a floor by using a rotation mop, but does not address detecting slippage and controlling a movement of the cleaning robot based on the slippage such that the movement of this robot cannot be accurately controlled. This reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
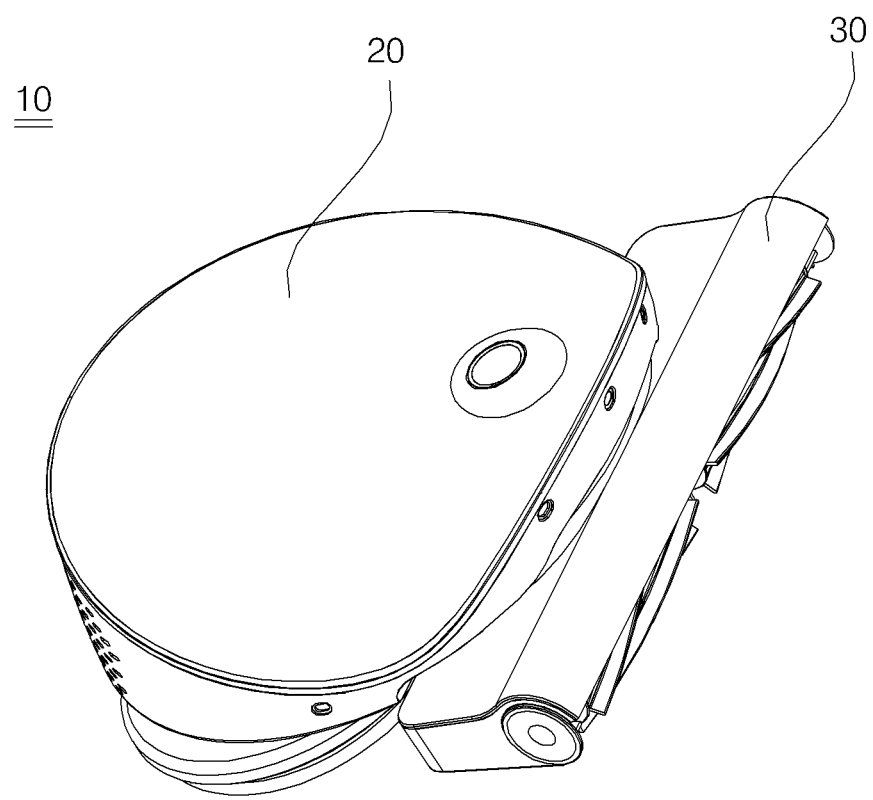
FIG. 1 is a perspective view of a robot cleaner according to an embodiment of the present disclosure.
Figure 2:
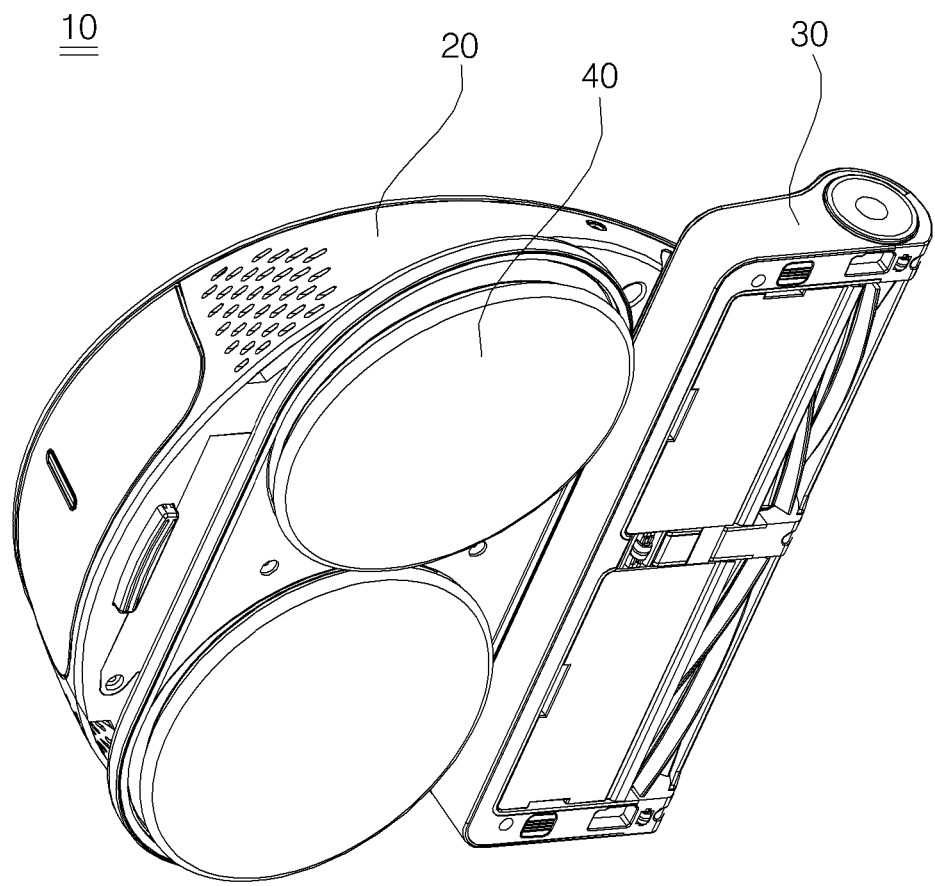
FIG. 2 is a bottom perspective view of a robot cleaner according to an embodiment of the present disclosure.

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure. Hereinafter, the present disclosure will be described with reference to the drawings for explaining a control method of a robot cleaner according to embodiments of the present disclosure.

Referring to FIG. 1 to FIG. 4, the configuration of a robot cleaner 10 that performs motion by rotation of a rotation mop according to the present embodiment will be briefly described. The robot cleaner 10 according to one embodiment may include a main body 20 that forms an outer shape of a portion of the robot cleaner 10, a rotation mop that moves the main body 20, and a drive motor 38 that drives the rotation mop.

The rotation mop used in the robot cleaner 10 in one embodiment may be equipped with a mop pad of a microfibre type or fabric type. Therefore, when the rotation mop rotates, a slip may occur in which the robot cleaner 10 does not move fully in comparison with the actual rotation of the rotation mop. For example, the microfibre or a fabric material of the mop pad may generate a relatively small friction force when rotated in contact with the floor.

In certain examples, the rotation mop may include a rolling mop driven along a rotational axis substantially parallel to the floor or a spin mop 40 driven by a rotational axis substantially perpendicular to the floor. Hereinafter, it is described that a slip ratio is obtained for the spin mop 40. As used herein, the slip rate may refer to the degree of slippage that occurs as the spin mop 40 rotates on the floor surface. A slip of rate of zero ('0') indicates that the robot cleaner 10 is moving at an ideal rotation speed associated with the rotation speed of the spin mop 40.

The slip ratio may vary depending on the material of the floor. For example, the spin mop 40 tends to slip more on a harder, smoother floor. In addition, the slip ratio may vary depending on a water content rate identifying a degree to which the spin mop 40 contains water. As the spin mop 40 holds more water, a relatively larger friction force with the floor surface is generated due to the influence of water against the floor, thereby reducing the slip ratio.

The robot cleaner 10 according to an embodiment may include a water tank 32, disposed inside the main body 20 and storing water, a pump 34 that supplies water stored in the water tank 32 to the spin mop 40, and a connection hose 36 that forms a connection path connecting the pump 34 and the water tank 32 or connecting the pump 34 and the spin mop 40. The robot cleaner 10 according to an embodiment may supply the water stored in the water tank 32 to the spin mop 40 using a water supply valve (not shown) without a separate pump (e.g., the water supply valve regulates water that flows in the connection hose 36 due to gravity, a syphon effect, and/or a capillary effect). The connection hose 36 forming the connection path according to the present embodiment may be formed of a connection pipe or may be directly connected to the spin mop 40 from the water tank 32 without a separate connection path.

The robot cleaner 10 according to one embodiment may include a pair of spin mops 40, and may rotate the pair of spin mops 40 to move. The robot cleaner 10 may control the movement of the robot cleaner 10 by varying the rotational direction and/or rotation speed of each of the spin mops 40. The robot cleaner 10 according to one embodiment may further include a cleaning module (or cleaning head) 30 which is disposed in front of the spin mop 40 and removes foreign substances from the floor before the spin mop 40 wipes the floor surface with a damp cloth.

Figure 3:
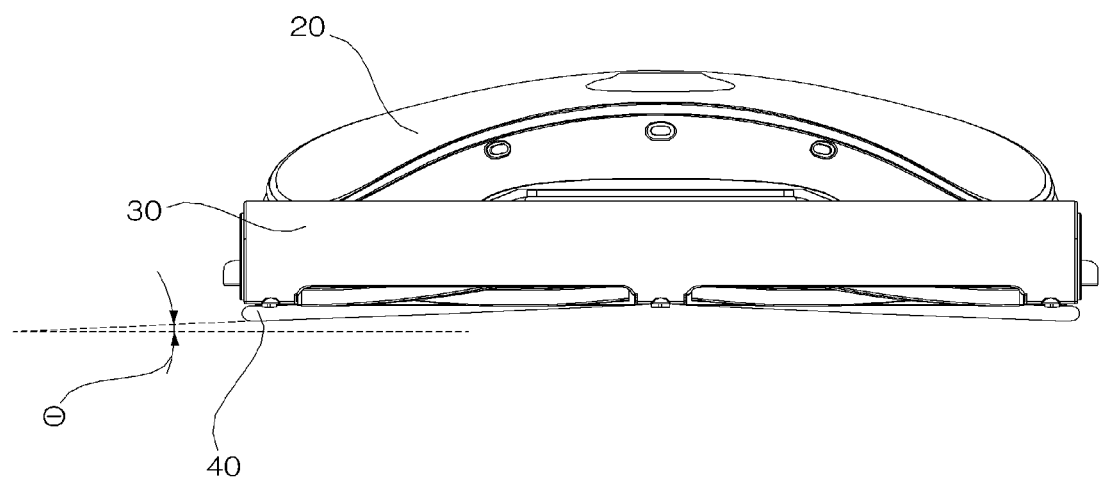
FIG. 3 is a front view of a robot cleaner according to an embodiment of the present disclosure.
Figure 4:
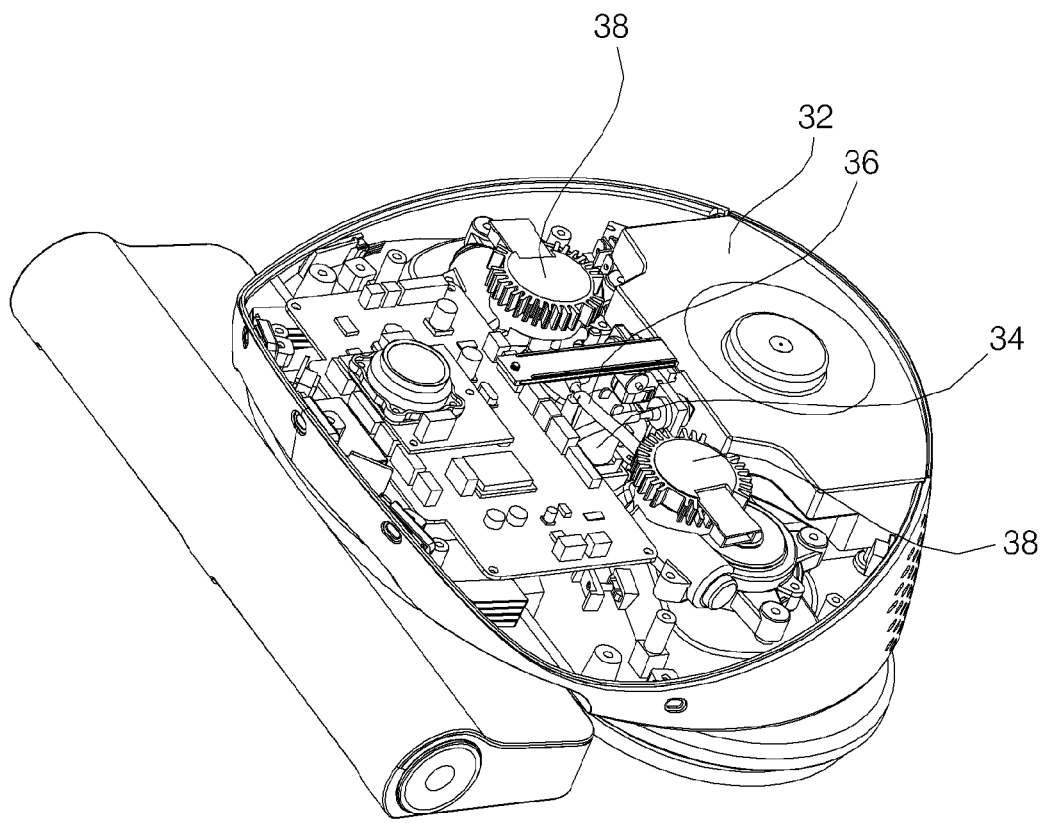
FIG. 4 is a view for explaining an internal configuration of a robot cleaner according to an embodiment of the present disclosure.

Referring to FIG. 3, the robot cleaner 10 according to one embodiment may position the spin mop 40 to be inclined by a certain angle θ based on the floor surface. In order to facilitate the movement of the robot cleaner 10, a spin mop 40 may be disposed in such a manner that the entire surface of the spin mop 40 does not evenly contact the floor surface but is tilted by a certain angle θ so that a certain portion of the spin mop is mainly in contact with the floor surface. In addition, the spin mop 40 may be positioned such that a relatively greater friction force is generated at a certain portion of a bottom surface of the spin mop 40 even if the entire surface of the spin mop 40 is in contact with the floor surface. For example, the spin mop 40 may be angled such that a lower portion of the spin mop 40 supports a relatively larger portion of a weight of the robot cleaner 10.

Figure 5:
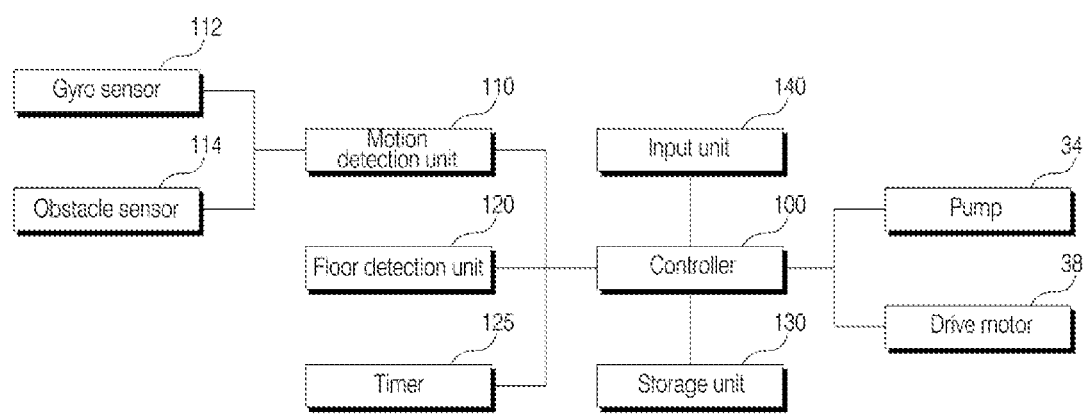
FIG. 5 is a block diagram illustrating a controller of a robot cleaner and a configuration relating to the controller according to an embodiment of the present disclosure.

FIG. 5 is a block diagram illustrating a controller of a robot cleaner and a configuration relating to the controller according to an embodiment of the present disclosure. The robot cleaner 10 according to an embodiment may further include a motion detection unit (or motion sensor) 110 that senses a motion of the robot cleaner 10 according to a reference motion of the main body 20 when the spin mop 40 rotates. The motion detection unit 110 may further include a gyroscopic (or gyro) sensor 112 that detects the rotation speed of the robot 10 or an acceleration sensor 114 that senses an acceleration of the robot cleaner 10. In addition, the motion detection unit 110 may include or may communicate with an encoder (not shown) that senses a moving distance of the robot cleaner 10.

The robot cleaner 10 according to an embodiment may further include a spin mop-encoder (not shown) that detects a rotation direction and/or a rotation number of the spin mop 40, when the spin mop 40 is operated to rotate. The robot cleaner 10 according to one embodiment may calculate the ideal movement speed of the robot cleaner based on the rotation direction and the rotation speed of each of the pair of spin mops 40, as detected by the spin mop-encoder. For example, the spin mop-encoder may determine the rotational speed and rotational direction of the spin mops 40 based on attributes of a driving power applied to a motor driving the spin mops 40.

The robot cleaner 10 according to the present embodiment may further include a timer 125 that measures an operation time of the robot cleaner 10 (e.g., a time duration that the spin mops 40 rotate). The robot cleaner 10 according to an embodiment may determine the actual movement speed of the robot cleaner 10 based on a moving distance of the robot cleaner 10 as detected, for example, by the motion detection unit 110 and an operation time measured by the timer 125.

A reference motion in the present embodiment may be a motion associated with driving the spin mop 40 of the robot cleaner 10. The slip ratio of the robot cleaner 10 may be calculated based on an actual movement of the robot cleaner measured using at least one of the gyro sensor 112 or the obstacle sensor 114 when the spin mop of the robot cleaner 10 is driven. The motion may be divided into a static motion in which the robot cleaner 10 rotates in place and a moving motion in which the robot cleaner 10 performs a straight movement or a curved path movement.

The gyro sensor 112 is a sensor that detects a rotation of the robot cleaner 10. In one embodiment, when the robot cleaner 10 rotates in place or travels in a curved path during the reference motion, the actual rotation speed of the robot cleaner 10 may be measured based on the rotation range of the robot cleaner 10 detected by the gyro sensor 112 and the time measured by the timer 125.

The obstacle sensor 114 is a sensor that detects a distance between the robot cleaner 10 and a front obstacle positioned ahead of the cleaning robot 10 (e.g., in a travel direction of the cleaning robot 10). In one embodiment, when the robot cleaner 10 moves straight during the reference motion, the actual straight speed may be measured based on the distance value detected by the obstacle sensor 114 of the robot cleaner 10 and the time measured by the timer.

The encoder may include a sensor or other component to detect the moving distance of the robot cleaner 10 and may measure the actual moving distance of the robot cleaner 10 when the robot cleaner 10 moves. For example, the encoder may measure an actual moving distance of the robot cleaner 10 during the reference motion.

The robot cleaner 10 according to one embodiment may further include a floor detection unit (or floor sensor) 120 that detects information of a floor surface on which the robot cleaner moves. In one example, the floor detection unit 120 may collection information that may be used to classify the type of material of the floor surface on which the robot cleaner 10 moves as a hard floor, marble, carpet, or the like.

The floor detection unit 120 may determine attributes of the material of the floor based on a current supplied to a motor driving a component of the robot cleaner 10 contacting the floor (e.g., a motor driving a rotation of the spin mops 40). For example, the floor detection unit 120 may determine a smoothness of the floor based on attributes of the current used to drive a movement of a component on the floor. In addition, the floor detection unit 120 may obtain images information according to a plurality of light sources by using a camera sensor having a light source and an image sensor, and may compare the obtained images to determine the material of the floor.

The robot cleaner 10 may further include a cliff sensor 120a, 120b that detect a presence or absence of a cliff on the floor in the cleaning area. The robot cleaner 10 according to an embodiment may include a plurality of cliff sensors 120a, 120b. The cliff sensors 120a, 120b according to an embodiment may be disposed in a front portion of the robot cleaner 10 (e.g., on or near the cleaning module 30), but the cliff sensors 120a, 120b may be located at other portions of the robot cleaner 10. The cliff sensor 120a, 120b according to one embodiment may include at least one light emitting element that outputs light and at least one light receiving element or detector that detects a reflection of the light from the floor.

In one example, one or more of the cliff sensors 120a, 120b may be used as the floor detection unit 120. A controller 100 may determine the material of the floor based on the amount of a reflect light which is output from the light emitting element and is reflected from the floor and received by the light receiving element. For example, when the light amount of the reflect light is equal to or greater than a certain value, the controller 100 may determine the material of the floor is a hard floor, and if the light amount of the reflect light is smaller than the certain value, the controller may determine the material of the floor is a carpet or other non-reflective material.

In detail, the floor may have a different degree of reflection of light depending on the material, and the hard floor may reflect a relatively large amount of light, and the carpet may reflect a relatively small amount of light. Therefore, the controller 100 may determine the material of the floor based on the amount of a reflect light which is output from the light emitting element and is reflected from the floor and received by the light receiving element. For example, if the light amount of the reflect light is equal to or greater than a certain reference value, the controller may determine the material of the floor as a hard floor, and if the light amount of the reflect light is smaller than the certain value, it may determine the material of the floor as a carpet.

In one example, a reference value that is used to determine the material of the floor may be set for one or more distances between the floor and the cliff sensor 120a, 120b. For example, one reference value may be used the distance from the floor detected by the cliff sensor 120a and 120b is 25 mm, and a second, different reference value may be used when the distance is 35 mm. For example, different references values may be used to adjust for differences in amounts of lights that would reach and reflect off the floor at different distances.

Meanwhile, when the distance to the floor is too short, a significant difference in the amount of the reflect light may not be accurately detected. At relatively short distances, an amount of emitted light that is reflected and detected from the floor may be substantially similar, regardless of a floor material or other attribute of the floor since the cliff sensor 120a, 120b may still receive and detect light that is deflected by a carpeted or textured floor. Therefore, only when the distance to the floor detected by the cliff sensor 120a, 120b is a certain distance or more, the controller may 100 use the above distance as a determination reference of the floor material. For example, the controller 100 may determine the material of the floor based on the amount of the reflect light which is detected when the distance to the floor detected by the cliff sensors 120a, 120b is 20 mm or more.

According to an embodiment of the present disclosure, carpet may be identified based on the amount of the reflect light detected by the cliff sensor 120a, 120b, and the floor state may be determined doubly or trebly by using the amount of the reflect light detected by the cliff sensor 120a, 120b and the current value of a motor load related to rotating the spin mops 40. For example, a certain amount of power may be sufficient to drive the spin mops to rotate on a hard, smooth flooring material, but greater power would be applied to drive the spin mops to rotate at a similar rotation speed on carpeted flooring. Thus, attributes of the floor may be more accurately identified through the different identification criteria.

The robot cleaner 10 according to one embodiment may include a controller 100 which measures the slip ratio of the spin mop 40 based on the information detected by the motion detection unit 110 (e.g., a travel distance) and the timer 125 (e.g., a travel time), and compensates for any slippage of the robot cleaner 10 based on the measured slip ratio to control the rotation of the spin mop.

The robot cleaner 10 according to one embodiment may further include a storage unit (or memory) 130 which stores data related to a correlation between the measured slip ratio and information of the floor material. For example, the storage unit 130 may store data regarding the relationship between the floor material and the slip ratio as at least one experimentally measured value or may store data about the floor material and the slip ratio that was measured during the traveling of the robot cleaner 10.

The storage unit 130 may store experimentally determined data associated with the correlation between the ideal rotation speed of the robot cleaner 10 according to the rotation amount of the spin mop 40 and the actual rotation speed of the robot cleaner 10 measured by the gyro sensor 112. The storage unit 130 may also store experimentally determined data associated with the correlation between the actual straight movement speed and the ideal straight movement speed of the robot cleaner 10.

The controller 100 may measure the slip ratio of the spin mop based on the information detected by the motion detection unit 110 (e.g., a movement distance and/or rate), and the information associated with the rotation the spin mop 40 determined by a spin mop-encoder (e.g., a rotation rate identifying a number of rotation per unit of time). The controller 100 may measure the slip ratio of the spin mop based on comparing the actual speed of the robot cleaner 10 measured by the motion detection unit 110 and an ideal speed of the robot cleaner 10 that is determined based on the measured rotation rate of the spin mop 40 determined by the spin mop-encoder or other information regarding the rotation of the spin mop 40 (e.g., an attribute of a current driving the rotation of the spin mop 40). The controller 100 may measure the slip ratio of the robot cleaner 10 based on the information detected by the motion detection unit 110 when the robot cleaner 10 performs the reference motion.

The controller 100 may further calculate a slip ratio of the robot cleaner 10 by using data stored in the storage unit 130 and based on the floor material determined by the floor detection unit 120. For example, a slip ratio may be estimated based on a texture, hardness, slope, or other attribute of the surface on which the robot cleaner is travelling. The controller 100 may compensate for the slip ratio of the robot cleaner as calculated based on the information detected by the motion detection unit 110 (e.g., the actual motion of the robot cleaner 10) and/or the slip ratio as calculated based on the floor material information.

For example, when the robot cleaner 10 rotates or turns, the controller 100 may compare an ideal rotation speed of the robot cleaner 10 according to the rotation number of the spin mop 40 measured by the spin mop-encoder with the actual rotation speed of the robot cleaner 10 measured by the gyro sensor 112 to calculate a slip ratio. When the robot cleaner 10 moves straight, the controller 100 may compare the ideal straight movement speed of the robot cleaner 10 according to the rotation number of the spin mop 40 measured by the spin mop-encoder with the actual straight movement speed of the robot cleaner 10 measured by the obstacle sensor 114 to calculate a slip ratio. Additionally, when the robot cleaner 10 moves, the controller 100 may compare the ideal speed of the robot cleaner 10 according to the rotation of the spin mop 40 with the speed of the robot cleaner 10 measured by the encoder to calculate a slip ratio.

When the robot cleaner is turning in place or moving along a curved path, a correlation between the ideal rotation speed of the robot cleaner 10 may be experimentally defined according to the rotation amount of the spin mop 40 and the actual rotation speed of the robot cleaner 10 measured by the gyro sensor 112, and a slip ratio may be estimated using a correlation table. The slip ratio may also be determined through a slip ratio formula identifying a correlation between the ideal rotation speed of the robot cleaner 10 and the measured rotation speed of the robot cleaner 10.

Similarly, when the robot cleaner 10 performs a straight movement, a correlation may be defined between the actual straight movement speed and the ideal straight movement speed of the robot cleaner 10 and a slip ratio may be estimated by using a correlation table. Alternatively, a slip ratio may be calculated through a slip ratio formula by using the ideal straight movement speed of the robot cleaner 10 and the actual straight movement speed of the robot cleaner 10 measured by the obstacle sensor 114.

The robot cleaner 10 according to one embodiment may further include an input unit 140 (or user interface) to receive a user input, such as a user's command. For example, a user may set the traveling method of the robot cleaner 10 or the movement speed of the robot cleaner 10, through the input unit 140.

Figure 6A:
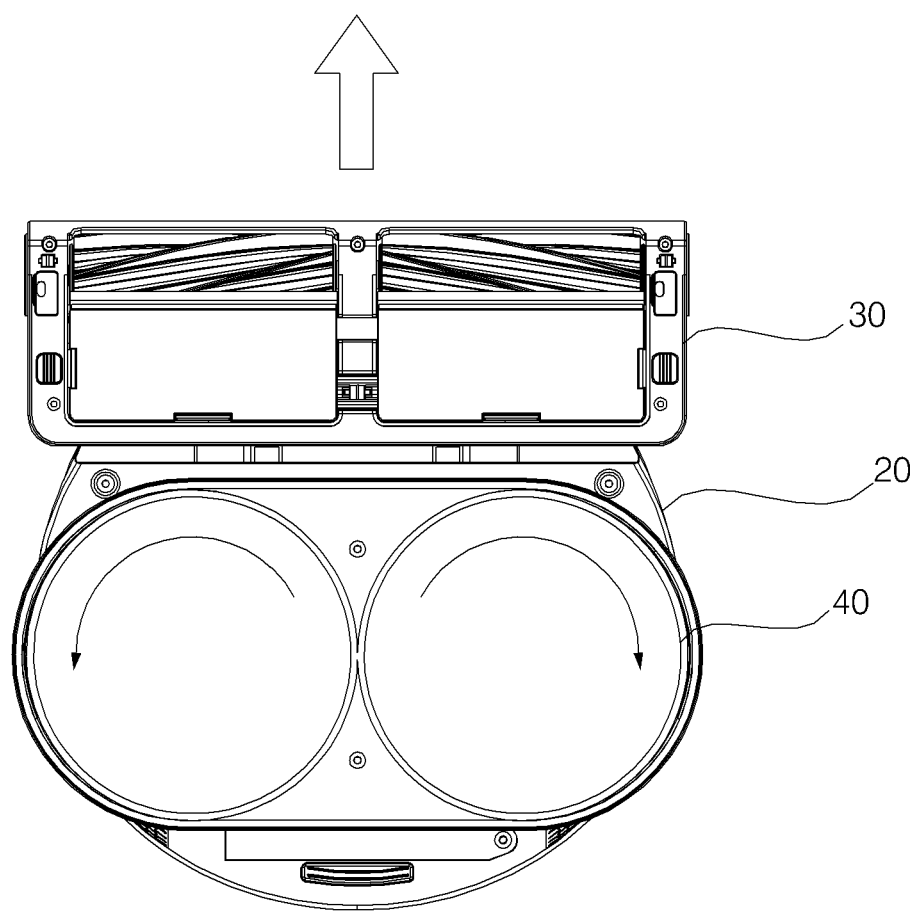
FIG. 6A is a view for explaining a straight movement of a robot cleaner among motions according to an embodiment of the present disclosure.
Figure 6B:
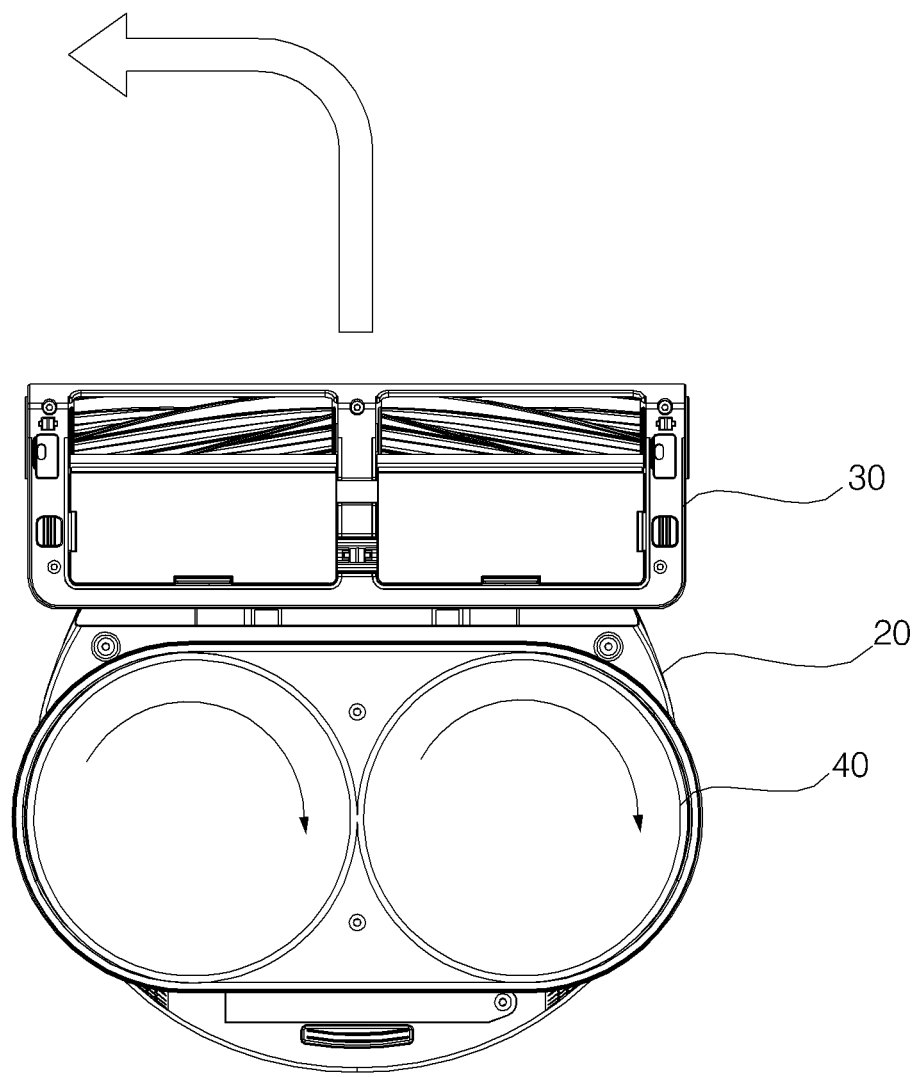
FIG. 6B is a view for explaining a turning movement of a robot cleaner having a large turning radius among motions according to an embodiment of the present disclosure.
Figure 6C:
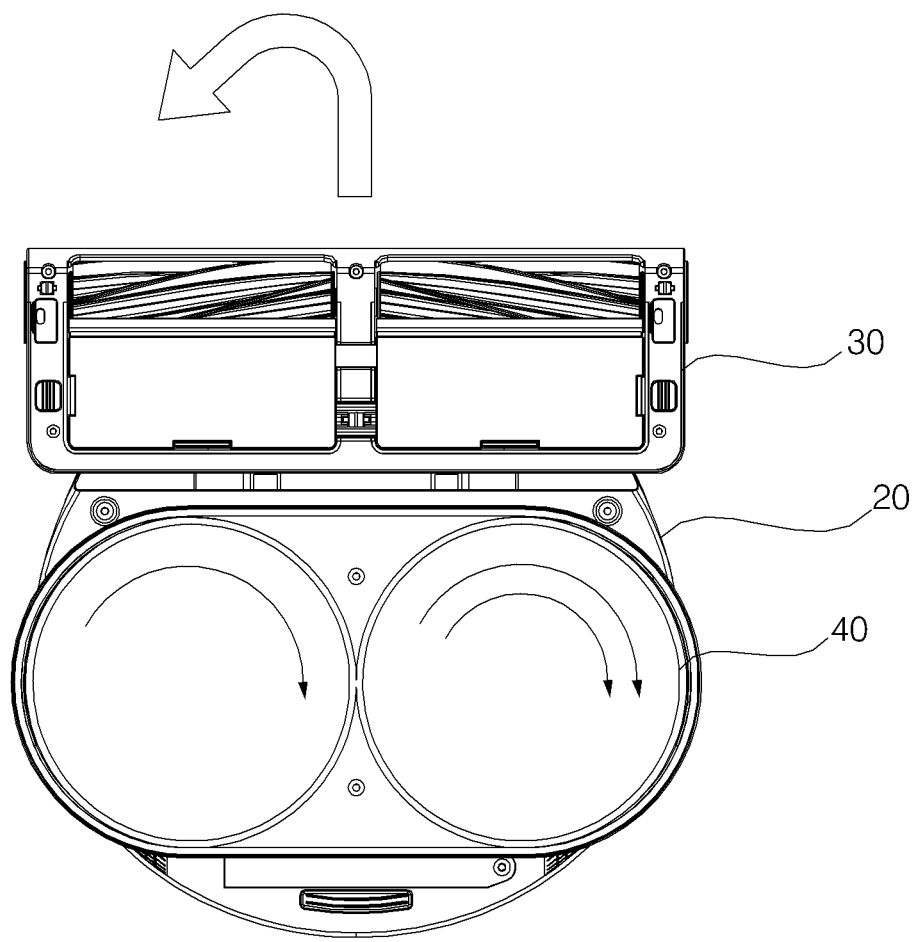
FIG. 6C is a view for explaining a turning movement of a robot cleaner having a small turning radius among motions according to an embodiment of the present disclosure.
Figure 7:
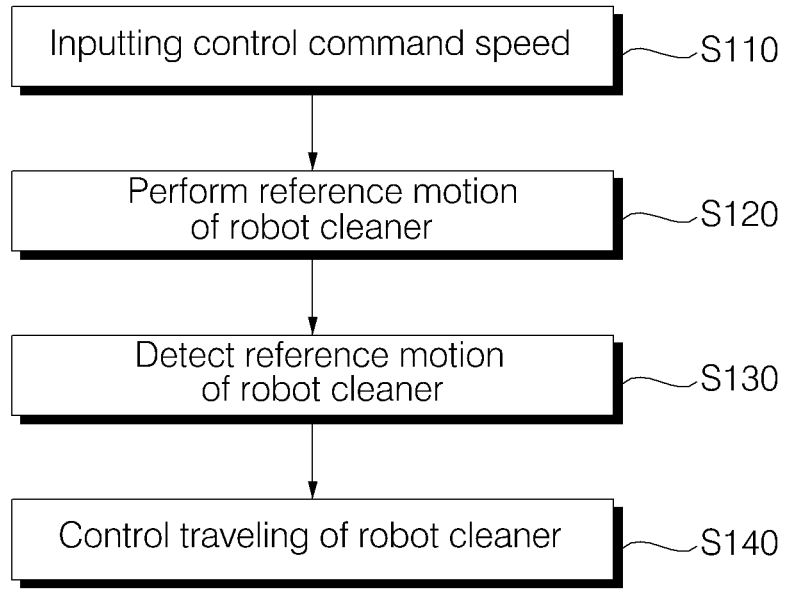
FIG. 7 is a flow chart illustrating a method for controlling traveling of a robot cleaner according to an embodiment of the present disclosure.

FIGS. 6A-6C are views related to motions of the robot cleaner 10 according to an embodiment of the present disclosure. Hereinafter, with reference to FIGS. 6A-6C, a method of obtaining a slip ratio according to the traveling of the robot cleaner due to the rotation of the spin mop and the movement of the robot cleaner will be described.

The robot cleaner 10 according to one embodiment may include multiple spin mops 40, and may move by rotating the spin mops 40. The robot cleaner 10 may control the traveling of the robot cleaner 10 by varying the rotation direction and/or rotation speed of each or more of the pair of spin mops 40. In the example shown in the drawings, the robot cleaner 10 may include a pair of the spin mops 40, but it should be appreciated that the robot cleaner 10 may include different qualities of spin mops 40. For example, the robot cleaner 10 may include multiple pairs of spin mops 40, and the traveling of the robot cleaner 10 be controlled by varying the rotation direction or rotation speed of the pairs of spin mops 40. In another example, the robot cleaner 10 may include three or more spin mops 40, and the traveling of the robot cleaner 10 be controlled by varying the rotation direction and/or rotation speed of a pair (e.g., an outside pair) of the spin mops 40.

Referring to FIG. 6A, the straight movement of the robot cleaner 10 may be performed by rotating each of the pair of spin mops 40 in opposite directions. In this case, the rotation speed of each of the pair of spin mops 40 may be substantially the same, but the rotation direction may be different. The robot cleaner 10 may perform a forward movement or a backward movement by changing the rotation direction of both spin mops 40. In another example, the rotation speeds of the pair of spin mops 40 may differ slightly to maintain a straight movement despite differences, for example, in the floor, different wearing of the spin mops 40, differences in mops pads used in the spin mops, different dirt levels or moisture levels of the spin mops 40, etc.

Referring to FIGS. 6B and 6C, the robot cleaner 10 may turn when each of the pair of spin mops 40 rotates in a same direction. The robot cleaner 10 may rotate in place or travel in a curved path by varying the rotation speed of each of the pair of spin mop 40. The radius of turning round may be adjusted by varying the rotation speed ratio of each of the pair of spin mops 40 of the robot cleaner 10. For example, in FIG. 6B, each of the pair of spin mops 40 rotates at a similar rotation speed in a common rotation direction to cause the robot cleaner 10 to move along a curved path in a given direction opposite to the rotation direction, and in FIG. 6C, one of the spin mops 40 (e.g., the right-side spin mop 40) rotates at a relatively greater rotation speed to cause the robot cleaner 10 to move along a more sharply curved path or to rotate in place.

Hereinafter, a method of controlling the robot cleaner 10 according to an embodiment will be described with reference to FIG. 7 to FIG. 10. The robot cleaner 10 according to one embodiment may perform a step S110 of receiving an input related to a control command speed. The user may directly input (e.g., via the input unit 140) a commend identifying one of a command speed of the robot cleaner 10 or a traveling method of the robot cleaner 10. When information specifying the traveling method of the robot cleaner 10 is inputted, the command speed corresponding to the traveling method may also be inputted. As used herein, the control command speed may refer to a speed at which the robot cleaner 10 moves when a slip does not occur in the spin mop 40 of the robot cleaner.

The robot cleaner 10 according to the present embodiment may attempt to perform a reference motion (S120). The reference motion refers to a motion during which the spin mop 40 of the robot cleaner 10 is driven so as to calculate the slip ratio of the robot cleaner 10 using at least one of the gyro sensor 112 or the obstacle sensor 114. The reference motion may include one or more of a static motion in which the robot cleaner 10 rotates in place or a moving motion in which the robot cleaner 10 performs a straight movement or a curved path movement.

When performing the reference motion in S120, the robot cleaner 10 rotates the spin mop 40 based on the inputted control command speed. When the robot cleaner 10 attempts to perform the intended reference motion, a slip may occur during the rotation of the spin mop 40, and a difference between the actual movement speed of the robot cleaner 10 and the input control command speed may occur. The spin mop 40 may be rotated based on a slip ratio of '0' (e.g., based on assumption that no slippage occurs such that an actual movement of the robot cleaner 10 corresponds to the reference motion).

As previously described, when performing the reference motion in step S120, the robot cleaner 10 may turn or move straight. When the intended reference motion in step S120 includes a turning movement, the robot cleaner 10 according to one embodiment may rotate a pair of spin mops 40 in a same direction to rotate or turn the robot cleaner 10. The robot cleaner 10 may rotate in place or perform a turning movement by varying the rotation speeds of each of the pair of spin mops 40.

When the reference motion in step S120 includes a straight movement, the robot cleaner 10 according to one embodiment may move straight when the pair of spin mops 40 rotate in different (e.g., opposing) directions. In this case, the rotation speed of each of the pair of spin mops 40 may be substantially the same, and the direction of rotation may be different. The robot cleaner 10 may change the straight movement speed of the robot cleaner 10 by varying the driving speed of one or more of the spin mops 40. As previously described, the robot cleaner may move along a slightly curved path by rotating the spin mops 40 in different direction and at different speeds.

Thereafter, the robot cleaner 10 may perform a step S130 of detecting the reference motion. When detecting the reference motion in step S130, the robot cleaner 10 may detect the actual movement speed of the robot cleaner 10 when performing the reference motion. That is, the actual movement speed of the robot cleaner 10 when a slip is generated due to the rotation of the spin mop 40 may be detected. In the reference motion detection step S130 according to one embodiment, the straight movement speed or turning movement speed of the robot cleaner 10 can be detected.

With the substantially straight movement, the robot cleaner 10 according to one embodiment may detect the straight movement distance using the obstacle sensor 114. With the substantially straight movement, the robot cleaner 10 according to an embodiment may detect the straight movement speed using the obstacle sensor 114 and the timer 125. That is, with the substantially straight movement, the actual straight movement speed may be detected by using the change of the distance value measured by the obstacle sensor 114 and the change of the time measured by the timer.

With the turning movement, the robot cleaner 10 according to an embodiment can detect the turning movement speed using the gyro sensor 112. With the turning round movement, the robot cleaner 10 according to an embodiment may detect the turning movement speed by using the gyro sensor 112 and the timer 125. That is, with the turning movement, the turning movement speed may be detected using the change of the rotation angle measured by the gyro sensor 112 and the change of the time measured by the timer. For example, the turning movement speed may correspond to an rotation angle of the robot cleaner per unit of time.

Thus, the reference motion of the robot cleaner 10 may be detected by the gyro sensor 112 or the obstacle sensor 114. In addition or alternatively, the reference motion of the robot cleaner 10 can be also detected by an encoder that detects the movement distance of the robot cleaner 10.

Thereafter, a step (S140) of controlling the traveling of the robot cleaner 10 may be performed. When controlling the traveling of the robot cleaner 10 in step S140, the actual movement speed of the robot cleaner may be corrected to achieve the desired control command speed. When controlling the traveling of the robot cleaner 10 in step S140, the rotation speed of the spin mop may be adjusted so that the detected actual movement speed of the robot cleaner substantially corresponds to the desired control command speed. For example, when the detected actual movement speed of the robot cleaner is smaller than the control command speed, the rotation speed of the spin mop 40 may be increased until the actual movement speed of the robot cleaner 40 increases to substantially correspond to the control command speed. conversely, when increasing the rotation speed of the spin mop 40 causes the actual movement speed of the robot cleaner 10 to exceed the control command speed, the rotation speed of the spin mop 40 may be reduced so that until the actual movement speed of the robot cleaner 40 is adjusted to correspond to the control command speed.

Figure 8:
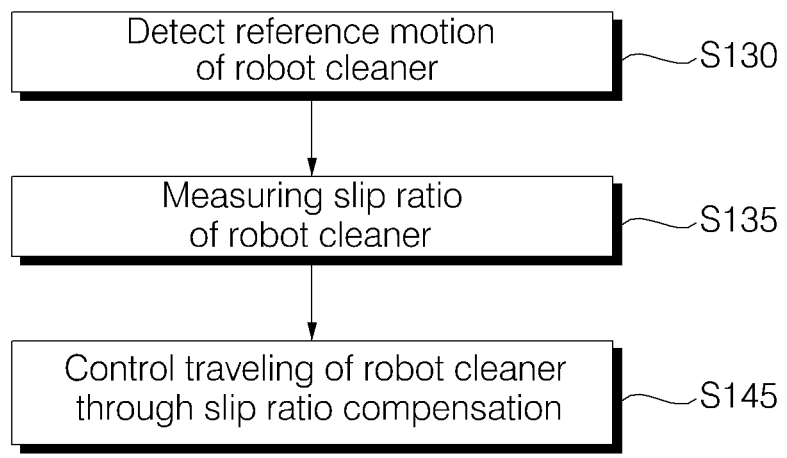
FIG. 8 is a flowchart illustrating a method of controlling traveling of a robot cleaner by calculating a slip ratio of the robot cleaner according to an embodiment of the present disclosure.

In one implementation, controlling the traveling of the robot cleaner 10 may include determining a slip ratio of the robot cleaner 10 and then controlling the traveling of the robot cleaner 10 through a slip ratio compensation. Referring to FIG. 8, the slip ratio of the robot cleaner 10 may be determined based on the detected reference motion of the robot cleaner. That is, after detecting the reference motion of the robot cleaner 10 in step S130, a step S135 of measuring the slip ratio of the robot cleaner 10 may be performed.

The controller 100 may measure the slip ratio based on the actual speed of the robot cleaner 10 measured by the motion detection unit 110 during the reference motion and the ideal speed of the robot cleaner 10 estimated according to the driving of the drive motor 38. For example, the ideal speed of the robot cleaner 10 may be estimated in step S135 according to the driving of the driving motor 38 as reflected by rotation speed of the spin mop 40 in accordance with the rotation or driving of the driving motor 38 and a radius of the spin mop 40.

When the robot cleaner 10 turns, the controller 100 may measure the slip ratio by using the actual rotation speed measured by the gyro sensor 112 and the rotation speed of the robot cleaner estimated according to the rotation of the spin mop 40. When the robot cleaner 10 performs a straight movement, the controller 100 may measure the slip ratio by using the actual movement speed of the robot cleaner measured by the obstacle sensor 114 and the timer 125 and the ideal movement speed of the robot cleaner estimated according to the rotation of the spin mop 40.

The slip ratio may be obtained based on generating a correlation table or otherwise storing data associated with an experimentally defined correlation between the ideal movement speed of the robot cleaner 10 according to the rotation speed and/or torque of the spin mop 40 and the actual movement speed of the robot cleaner 10 measured by the motion detection unit 110 or other component in step S130 and estimating a slip ratio by using the correlation table.

In another example, the slip ratio may be calculated by applying the ideal movement speed of the robot cleaner 10 and the measured movement speed of the robot cleaner 10 to a slip ratio formula. Hereinafter, calculating the slip ratio by using the slip ratio formula will be described. First, determining attributes of the spin mops 40, such as the radius and rotation speed of one or more of the spin mops 40 involved in the movement of the robot cleaner 10, will be described, and then measuring a corresponding slip ratio based on the attributes of the spin mops 40 will be described.

Figure 9:
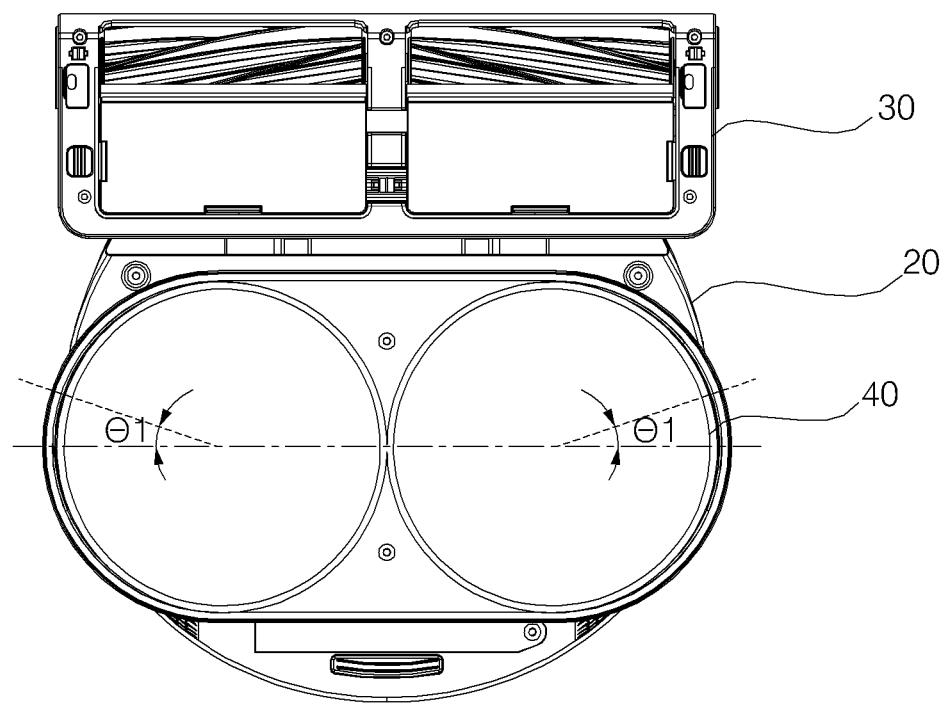
FIG. 9 is a view for explaining a portion where a spin mop of a robot cleaner is in contact with a floor surface according to an embodiment of the present disclosure.

The rotation speed of the robot cleaner 10 may depend on the radius R of the spin mop 40 and the rotation speed of each spin mop 40. As shown in FIG. 9, When the spin map 40 is disposed at an inclination to abut the floor surface at a point of the set angle θ1 with respect to a virtual line connecting the centers of the pair of spin mops 40, the radius R' of the spin mop 40 involved in the actual movement may be obtained as shown in the following Equation 1 with reference to FIG. 10.

$$R' = R * \cos \theta 1 \quad \text{(Equation 1)}$$

R' may correspond, for example, to a radius of a region of a bottom surface of the spin mop 40 that contacts the floor surface or applies at least a threshold amount of pressure on the floor surface.

Since a linear speed V1 at a portion where the spin mop 40 is in contact with the floor surface is formed at a portion having a set angle θ1 for the actual traveling of the spin mop 40, a linear speed V2 for the actual traveling direction may be expressed as shown in the following Equation 2, $$V2=V1*\cos θ1 \qquad \text{(Equation 2)}$$

Figure 10:
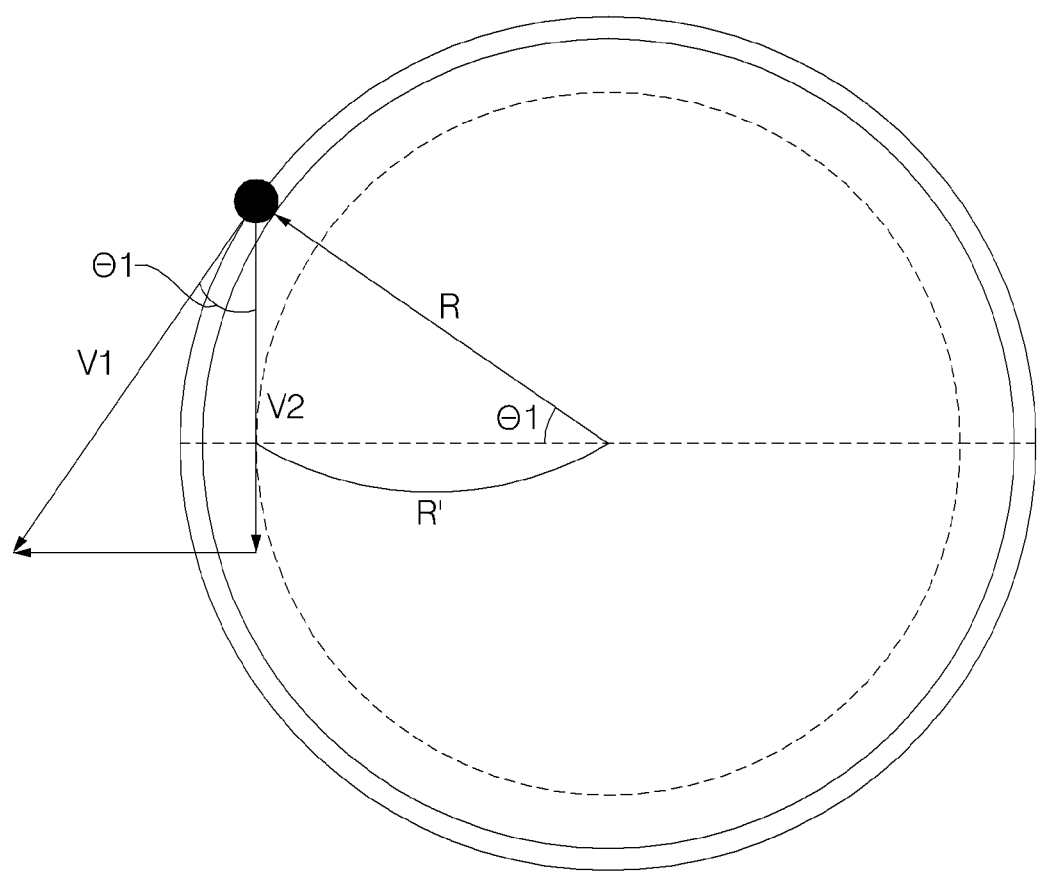
FIG. 10 is a view for explaining a range in which a spin mop is involved in an actual movement of a robot cleaner according to an embodiment of the present disclosure.

Referring to FIG. 10, a portion perpendicular to the linear speed V2 with respect to the actual traveling direction may be a radius R' of the spin mop 40 involved in the actual movement.

Hereinafter, an embodiment in which the slip ratio of the robot cleaner 10 is obtained depending on whether the robot cleaner 10 turns or moves straight will be described. The slip ratio Sr1 for the robot cleaner 10 that turns may be calculated based on the following Equation 3 by using the ideal rotation speed Rf of the robot cleaner 10 according to the rotation of each of the pair of spin mops 40 and the actual rotation speed Rr measured by the gyro sensor 112.

$$Sr1=(Rf-Rr)/Rf*100 \qquad \text{(Equation 3)}$$

The slip ratio Sr2 for the robot cleaner 10 that moves substantially straight (e.g., turns by less than a threshold angle) may be obtained using the obstacle sensor 114. The robot cleaner 10 according to one embodiment may compare the ideal speed of the robot cleaner 10 according to the rotation of each of the pair of spin mops 40 with the actual speed of the robot cleaner 10 measured by the obstacle sensor 114, and may calculate the slip ratio based on this comparison.

In another example, the slip ratio Sr2 when the robot cleaner 10 moves substantially straight during the reference motion may also be calculated by the following Equation 4 by using the ideal speed Vf of the robot cleaner 10 according to the rotation of each of the pair of spin mops 40 and the actual speed Vr of the robot cleaner 10 measured by the obstacle sensor 114. In the straight movement of the robot cleaner 10, the ideal speed Vf of the robot cleaner may be calculated based on the linear speed V2 of the spin mop calculated in the above Equation 2. As previously described, the speed Vr of the robot cleaner 10 may be calculated by the obstacle sensor 114 based on the changed distance value measured by the obstacle sensor 114 and in the changed time range measured by the timer 125.

$$Sr2=(Vf-Vr)/Vf*100 \qquad \text{(Equation 4)}$$

In addition, it is also possible to obtain the slip ratio by calculating the ratio of the ideal rotation number of the spin mop 40 and the actual rotation number of the spin mop 40 operated by the drive motor 38, in the range of the changed rotation angle determined by the gyro sensor 112.

Continuing with FIG. 8, a step S145 of controlling the traveling of the robot cleaner 10 through a slip ratio compensation based on the determined slip ratio may be performed. For example, controlling the motion of the robot cleaner 10 in step S145 may include modifying the rotational speed or angle of the spin mops 40. When the slip ratio Sr1 of the rotating robot cleaner 10 is determined in step S135, a compensated control speed Rm for rotating the robot 10 at the ideal rotation speed Rf of the robot cleaner at the control command speed may be calculated by the following Equation 5, by using the determined slip ratio Sr1 and the ideal rotation speed Rf of the robot cleaner 10, which may correspond to the control command speed of the robot cleaner 10.

$$Rm=Rf*100/(100-Sr1) \qquad \text{(Equation 5)}$$

The controller 100 may operate the drive motor 38 of the robot cleaner 10 in accordance with the control speed Rm determined in Equation 5. Here, the compensated control speed Rm may correspond to the rotation speed of the robot cleaner when the slip ratio is '0', and the actual rotation speed of the robot cleaner 10 becomes the control command speed.

When the robot cleaner 10, according to an embodiment, performs a substantially straight reference movement and the slip ratio Sr2 of the robot cleaner 10 is determined, the compensated control speed Vm for moving the robot cleaner 10 at the ideal rotation speed Vf of the robot cleaner, which may be used as the control command speed, may be calculated. For example, the compensated control speed Vm may be calculated using the following Equation 6, by using the determined slip ratio Sr2 and the ideal rotation speed Vf of the robot cleaner which is the control command speed of the robot cleaner 10.

$$Vm=Vf*100/(100-Sr2) \qquad \text{(Equation 6)}$$

The controller 100 may operate the drive motor 38 of the robot cleaner 10 in accordance with the compensated control speed Vm calculated in Equation 6. Here, the compensated control speed Vm is a straight movement speed of the robot cleaner when the slip ratio is '0', and the actual rotation speed of the robot cleaner 10 may be the control command speed.

Figure 11:
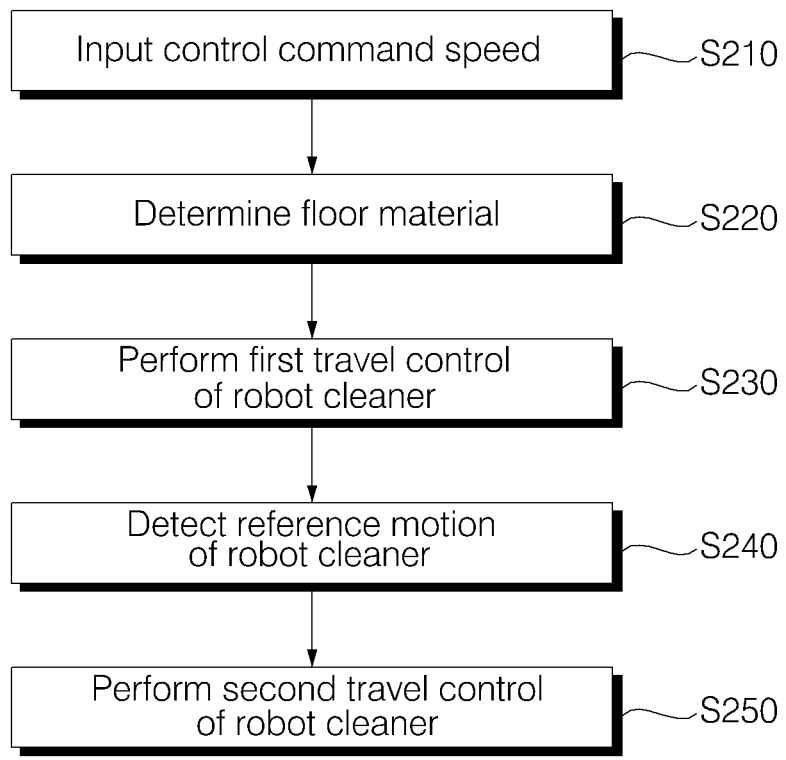
FIG. 11 is a flowchart illustrating a method of controlling a robot cleaner according to another embodiment of the present disclosure.
Figure 12:
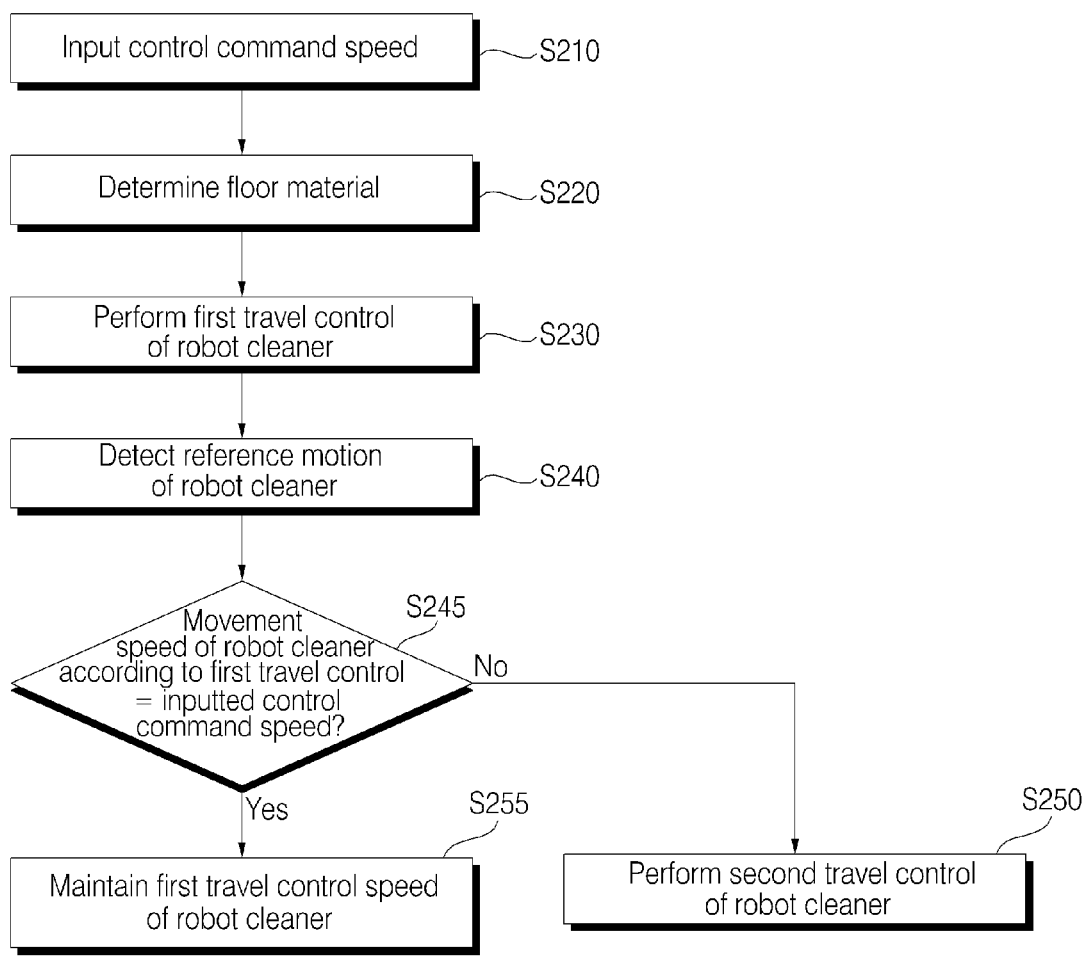
FIG. 12 is a flowchart illustrating a method of controlling a robot cleaner according to another embodiment of the present disclosure.

FIGS. 11 and 12 are flowcharts illustrating methods of controlling a robot cleaner according to other embodiments of the present disclosure. Referring to FIG. 11, the controller 100 may perform step S220 of determining the floor material. In one embodiment, the step S220 of determining the floor material is performed after the step S210 of determining the control command speed, but it should be appreciated that the displayed ordering is provided merely for explanation purposes, and the floor material may be determined in step S220 before the control command speed is determining in step S210. Determining the control command speed in step S210 may include receiving a user input and identifying the control command speed based on the user input. Additionally or alternatively, the control command speed may be automatically set based on various criteria, such as attributes of a floor surface, a desired travel speed for performing a cleaning function, a size of the region to be cleaned, a presence of a detected obstacle, etc.

As described above, the floor material may be determined by using current detection information of the motor driving the motion of the robot cleaner (e.g., the motor 38), data collected by the floor detection unit 120, and/or by using a camera sensor having a light source and an image sensor (e.g., a cliff sensor 120a, 120b).

Thereafter, the controller 100 may carry out a step S230 of performing a first travel control of the robot cleaner 10. The first travel control of the robot cleaner 10 in step S230 may include performing the reference motion of the robot cleaner 10 in consideration of the floor material. The storage unit 130 of the robot cleaner 10, according to one embodiment, may store data related to a correlation between the floor material and the slip ratio of the robot cleaner 10. The data stored in the storage unit 130 may be measured experimentally and/or may be determined during a prior operation of the robot cleaner 10. For example, the storage unit 130 may store data identifying different speeds, distances, or rotations associated with a movement of the robot cleaner at a different rotational speeds and directions of the spin mops 40 over different types of floor materials or conditions. The controller 100 may then select for the first travel control in step S230 certain rotational speeds and directions for the spin mops 40 that are expected to achieve the control command received in step S210 on the floor material determined in stop S220.

Performing the reference motion of the robot cleaner 10 in consideration of the floor material in step S230 may include performing the reference motion at a compensated control command speed or other movement attribute. For example, the compensated control command speed may be calculated by Equation 5 or Equation 6, in consideration of a slip ratio of the robot cleaner 10 that is determined at least partially based on the floor material. Similarly, the first travel control may include managing the rotation of the spin mops 40 such that the robot cleaner 10 moves a certain distance and/or rotates by a certain rotational angle or rotational speed.

Since the slip ratio of the robot cleaner 10, which is determined at least partially based on the floor material, may substantially follow the slip ratio that is determined according to the rough operation of robot cleaner, the robot cleaner 10 may move at an actual speed or other movement attribute that corresponds to the inputted control command speed or other inputted movement attribute. However, the slip ratio of the robot cleaner 10, which is determined by such a floor material, may be different from the slip ratio that occurs during the actual operation of the robot cleaner. This difference in the slip ratios may cause a difference between the control command speed or other inputted movement attribute and the actual speed or other actual movement attribute of the robot cleaner 10.

In order to adjust the detailed speed or other movement attribute of the robot cleaner 10, a step S240 of detecting the reference motion of the robot cleaner 10 may be performed. In the step S240, detecting the reference motion of the robot cleaner 10, as described above, may be accomplished by the gyro sensor 112, the obstacle sensor 114, an encoder (not shown), or other sensor device. For example, detecting the reference motion of the robot cleaner 10 in step S240 may include determining a distance travelled by the robot cleaner 10, a speed of the robot cleaner 10, and/or a turn angle of the robot cleaner 10 during the first travel control (e.g., currents to drive motors 38 are managed such that the spin mops 40 rotate in certain directions and at certain rotational speeds). In the step S240 of detecting the reference motion, the actual rotation angle and/or rotational speed of the robot cleaner 10 may be detected by the gyro sensor 112, and the actual straight movement direction and/or speed of the robot cleaner 10 may be detected by the obstacle sensor 114.

Thereafter, the controller 100 may execute a step S250 of performing a second travel control of the robot cleaner 10. The step S250 of performing the second travel control of the robot cleaner 10 may include correcting the actual movement of the robot cleaner, such as to adjust the actual movement speed or other actual movement attribute of the robot cleaner 10 to match the control command speed or other movement attribute. As described above, step S250 may include adjusting the rotation speed of one or more of and/or contact angle Θ of the spin mops 40. For example, the traveling of the robot cleaner may be controlled through the slip ratio compensation based on the slip ratio which is determined by the reference motion of the robot cleaner such that the detected actual movement speed, distance, rotation angle, etc. of the robot cleaner is adjusted to substantially equal to the control command speed, distance, rotation angle, etc.

However, the step S250 of performing the second travel control may proceed when there is at least a threshold difference between the movement speed or other measured movement attribute of the robot cleaner according to the first travel control and the inputted control command speed or other desired movement attribute, as determined when performing a step S245 of comparing the movement speed of the robot cleaner according to the first travel control with the inputted control command speed. Additionally, when the movement speed or other actual movement attribute of the robot cleaner 10 according to the first travel control substantially corresponds to the inputted control command speed or desired movement attribute (e.g., differs by less than a threshold amount), the second travel control in step S250 is bypassed, and a step S255 of maintaining the first travel control may be performed.

According to the present disclosure, the robot cleaner 10 may be characterized by one or more of the following aspects. First, the travel of the robot cleaner 10 may be controlled based on a difference between the actual movement speed of the robot cleaner through the reference motion and the ideal movement speed of the robot cleaner, so that the robot cleaner 10 in which the slip occurs can travel at a control command speed that is inputted by a user or otherwise determined (e.g., to perform a desired cleaning operation). Secondly, the rotation or straight movement speed of the robot cleaner can be accurately determined by using an obstacle sensor or a gyro sensor to detect the motion of the robot cleaner, so that the degree of slip and the degree of required compensation can be accurately determined. Thirdly, the rough slip ratio according to the floor material of the robot cleaner may be compensated for, and, secondarily, the slip ratio according to the actual speed of the robot cleaner may be compensated for, so that the control command speed inputted by a user or the like can be followed quickly.

The present disclosure provides a method of controlling a robot cleaner that travels at a movement speed desired by a user when a slip occurs in the robot cleaner. The present disclosure further provides a method of controlling a robot cleaner that accurately detects the straight movement speed of the robot cleaner when the robot cleaner moves straight, and compensates the movement speed of the robot cleaner. The present disclosure further provides a method of controlling a robot cleaner that controls the traveling of the robot cleaner more quickly.

In accordance with an aspect of the present disclosure, a method of controlling a robot cleaner which moves by rotation of a spin mop may include steps of: inputting a control command speed; operating the spin mop and performing a reference motion by the robot cleaner; detecting a movement speed of the robot cleaner which performs a reference motion by a motion detection sensor; and controlling travel of the robot cleaner at the input control command speed, so that the robot cleaner can travel at a control command speed inputted by a user or the like. In addition, performing a reference motion by the robot cleaner may include rotating the spin mop so as to reach the control command speed, based on a state where there is no slip, so that the robot cleaner can be controlled at the control command speed.

In accordance with an aspect of the present disclosure, a method of controlling a robot cleaner which moves by rotation of a spin mop may further include determining a slip ratio of the robot cleaner, based on the detected movement speed of the robot cleaner, wherein controlling travel of the robot cleaner at the input control command speed includes controlling the travel of the robot cleaner at the input control command speed by compensating a determined slip ratio, so that the robot cleaner can travel at the control command speed required by the user even in the case of the slip of the spin mop. According to the method of controlling a robot cleaner, detecting a movement speed of the robot cleaner may include detecting the movement speed of the robot cleaner measured by an obstacle sensor when the robot cleaner moves straight, so that the movement speed of the robot cleaner can be accurately detected when moving straight.

According to the method of controlling a robot cleaner, when the robot cleaner moves straight, the slip ratio $Sr2$ of the robot cleaner may be calculated by following Equation 1, by using an ideal speed $Vf$ of the robot cleaner according to the rotation of the spin mop and an actual speed $Vr$ of the robot cleaner measured by the obstacle sensor, so that the slip ratio of the robot cleaner according to the straight movement can be determined.

$$Sr2=(Vf-Vr)/Vf*100 \qquad \text{(Equation 1)}$$

According to the method of controlling a robot cleaner, when the robot cleaner moves straight, a compensated control speed $Vm$ for enabling the robot cleaner to travel at the control command speed may be calculated by following Equation 2, by using a determined slip ratio $Sr2$ and the ideal speed $Vf$ of the robot cleaner, so that the robot cleaner can be moved at the input control command speed based on the determined slip ratio.

$$Vm=Vf*100/(100-Sr2) \qquad \text{(Equation 2)}$$

According to the method of controlling a robot cleaner, detecting a movement speed of the robot cleaner includes detecting the movement speed of the robot cleaner measured by a gyro sensor when the robot cleaner turns round, so that the movement speed of the robot cleaner can be accurately detected when turning round.

According to the method of controlling a robot cleaner, when the robot cleaner turns round, a slip ratio $Sr1$ of the robot cleaner may be calculated by following Equation 3, by using an ideal speed $Rf$ of the robot cleaner according to the rotation of the spin mop and an actual speed $Rr$ of the robot cleaner measured by the gyro sensor, so that the slip ratio of the robot cleaner according to the turning round can be determined.

$$Sr1=(Rf-Rr)/Rf*100 \qquad \text{(Equation 3)}$$

According to the method of controlling a robot cleaner, when the robot cleaner turns round, a compensated control speed $Rm$ for enabling the robot cleaner to travel at the control command speed may be calculated by following Equation 4, by using a determined slip ratio $Sr1$ and the ideal speed $Rf$ of the robot cleaner, so that the robot cleaner can be moved at the input control command speed based on the determined slip ratio.

$$Rm=Rf*100/(100-Sr1) \qquad \text{(Equation 4)}$$

In accordance with another aspect of the present disclosure, a method of controlling a robot cleaner which moves by rotation of a spin mop may include steps of: inputting a control command speed; determining floor material information; performing a first travel control of the robot cleaner based on the floor material information; detecting a motion according to the first travel control of the robot cleaner; and performing a second travel control of the robot cleaner at the input control command speed, so that the compensation for the control command speed can be achieved in two steps.

According to the method of controlling a robot cleaner, performing a first travel control of the robot cleaner may include performing a reference motion at a compensated control command speed in consideration of a slip ratio of the robot cleaner determined based on the floor material information, so that it is possible to control the traveling of the robot cleaner based on the approximate slip ratio determined by the floor material.

According to the method of controlling a robot cleaner, detecting a motion according to the first travel control may include detecting a movement speed of the robot cleaner measured by a motion sensor, and detecting a movement speed of the robot cleaner measured by an obstacle sensor when the robot cleaner moves straight, so that it is possible to determine the actual straight movement speed of the robot cleaner to measure the current slip ratio.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a robot cleaner which moves based on a rotation of a spin mop, the method comprising:
    receiving a control command associated with a desired movement attribute;
    determining material information associated with a surface contacted by the spin mop;
    performing a first travel control of the robot cleaner based on the material information;
    detecting an actual movement attribute of the robot cleaner during the first travel control;
    determining a slip ratio of the robot cleaner based on a comparison of the detected actual movement attribute of the robot cleaner during the first travel control and the desired movement attribute; and
    performing a second travel control of the robot cleaner after the first travel control based on the control command and the actual movement attribute of the motion of the robot cleaner during the first travel control,
    wherein performing the second travel control of the robot cleaner includes controlling the robot cleaner to perform the second travel control at a speed that is compensated for in consideration of the slip ratio that is determined based on the first travel control, and
    wherein detecting the actual movement attribute of the robot cleaner during the first travel control includes measuring a movement speed of the robot cleaner by an obstacle sensor when the robot cleaner moves straight.

2. The method of claim 1, wherein first travel control of the robot cleaner includes rotating the spin mop to reach the control command speed during the first travel control of the robot cleaner when there is no slip between the spin mop and a surface contacting the spin mop.

3. The method of claim 1, wherein the slip ratio (Sr2) of the robot cleaner when the robot cleaner moves straight is calculated as:

$$Sr2=(Vf-Vr)/Vf*100,$$

in which Vf is an ideal speed of the robot cleaner according to a first rotation of the spin mop, and Vr is an actual speed of the robot cleaner as measured by the obstacle sensor.

4. The method of claim 3, wherein a compensated control speed (Vm) associated with the robot cleaner travelling straight at a control command speed associated with the control command is calculated as:

$$Vm=Vf*100/(100-Sr2).$$

5. The method of claim 1, wherein:
    the slip ratio is a first slip ratio, and
    performing the first travel control of the robot cleaner includes:
        detecting an attribute of a surface contacted by the spin mop;
        determining a second slip ratio based on the attribute of the surface contacted by the spin mop; and
        determining the first rotation travel control of the robot cleaner based on the second slip ratio.

6. The method of claim 1, wherein the slip ratio is further determined based on an attribute of a surface contacted by the spin mop.

7. The method of claim 1, wherein the first travel control corresponds to the second travel control when the actual movement attribute and the desired movement attribute differ by less than a threshold amount.

8. The method of claim 7, wherein performing the second travel control includes modifying at least one of a rotational speed, a rotational direction, or an axial angle of the spin mop.

9. The method of claim 1, wherein the spin mop is included in a plurality of spin mops, and each of the first travel control and the second travel control includes respective rotations by the plurality of spin mops.

10. A method of controlling a robot cleaner which moves based on a rotation of a spin mop, the method comprising:
    receiving a control command associated with a desired movement attribute;
    determining material information associated with a surface contacted by the spin mop;
    performing a first travel control of the robot cleaner based on the material information;
    detecting an actual movement attribute of the robot cleaner during the first travel control;
    determining a slip ratio of the robot cleaner based on a comparison of the detected actual movement attribute of the robot cleaner during the first travel control and the desired movement attribute; and performing a second travel control of the robot cleaner after the first travel control based on the control command and the actual movement attribute of the robot cleaner during the first travel control, wherein performing the second travel control of the robot cleaner includes controlling the robot cleaner to perform the second travel control at a speed that is compensated for in consideration of the slip ratio that is determined based on the first travel control, and wherein detecting the actual movement attribute of the robot cleaner during the first travel control includes detecting a movement speed of the robot cleaner measured by a gyroscopic sensor when the robot cleaner turns.

11. The method of claim 10, wherein performing the first travel control of the robot cleaner includes controlling the robot cleaner to perform a reference motion at a speed that is compensated for in consideration of another slip ratio that is determined based on the floor material information.

12. The method of claim 10, wherein detecting the actual movement attribute of the robot cleaner during the first travel control includes detecting at least one of a turning angle or a movement speed of the robot cleaner when turning.

13. The method of claim 10, wherein:

the control command identifies a desired movement attribute, performing the second travel control includes determining the second travel control based a comparison of the actual movement attribute of the motion of the robot cleaner during the first travel control and the desired movement attribute, and the second travel control corresponds to the first travel control when the actual movement attribute of the motion of the robot cleaner during the first travel control and the desired movement attribute differs by less than a threshold amount.

14. The method of claim 13, wherein determining the second travel control includes:

calculating the slip ratio based on the comparison of the actual movement attribute of the motion of the robot cleaner during the first travel control and the desired movement attribute; and modifying the rotation of the spin mop during the first travel control based on the slip ratio.

* * * * *